March 3, 1964

J. TOBLER 3,122,824

METHOD FOR PRODUCING RADIATORS

Filed April 13, 1959

INVENTOR:
JACOB TOBLER

By Toulmin & Toulmin

Attorneys

March 3, 1964     J. TOBLER     3,122,824

METHOD FOR PRODUCING RADIATORS

Filed April 13, 1959     3 Sheets-Sheet 2

INVENTOR:
JACOB TOBLER

By Toulmin & Toulmin

Attorneys

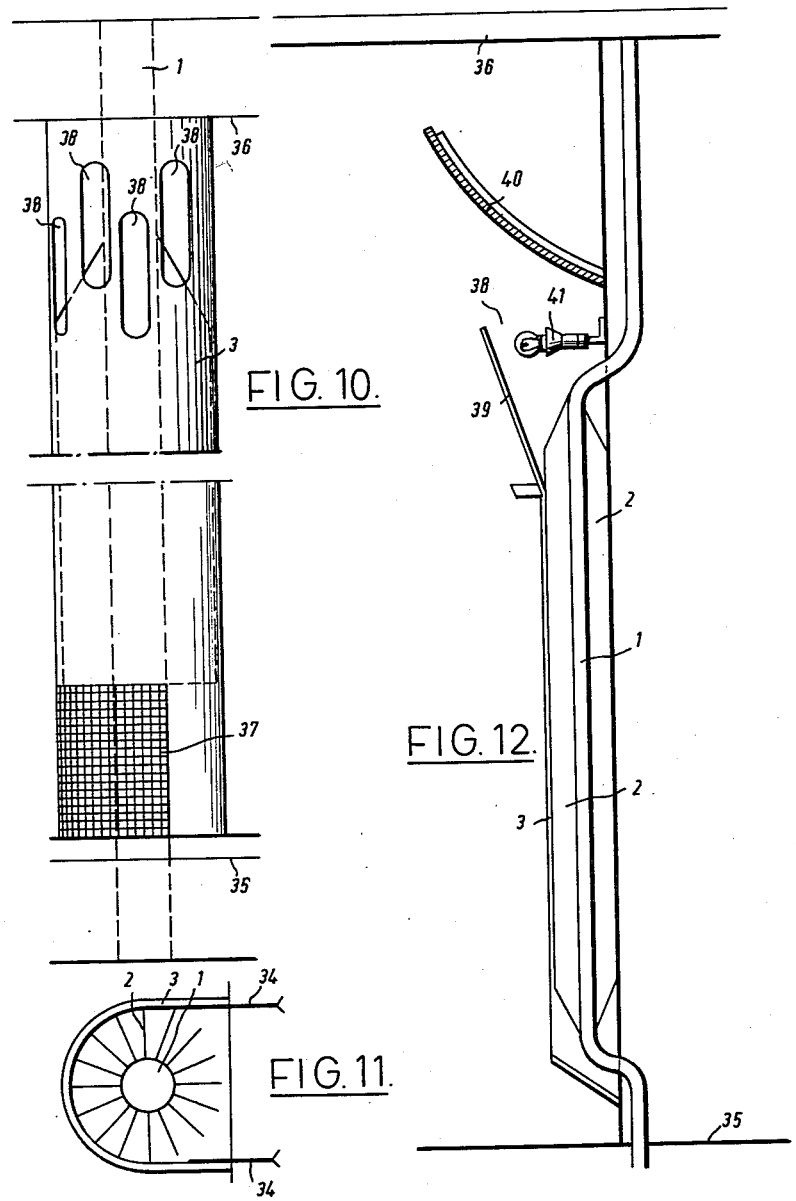

United States Patent Office 3,122,824
Patented Mar. 3, 1964

3,122,824
METHOD FOR PRODUCING RADIATORS
Jacob Tobler, 55 Kamorstr., Schaffhausen, Switzerland
Filed Apr. 13, 1959, Ser. No. 895,880
Claims priority, application Germany Jan. 8, 1959
2 Claims. (Cl. 29—157.3)

The invention concerns a method for producing radiators which are formed by radial plates disposed between an external jacket and an internally disposed circular pipe, wherein the radial plates are fixed by means of brazing. The invention moreover concerns the apparatus used for carrying out the method and the radiators produced in accordance with the method.

It is the object of the invention to provide a radiator by means of the method and apparatus which has a particularly good degree of thermal efficiency ensuring the rapid heating of a room and which is of pleasant appearance when mounted in position. A further object is the cheap and economic manufacture of such radiators and to impart great durability thereto.

The solution of the problem according to the invention resides in the fact, that the radial plates are disposed between the jacket and on the pipe in ribs retaining them both locked by shape and by mechanical forces, whereby after pressing of brazing wire into these grooves and tensioning the radial plates by means of the jacket, the radial plates are secured simultaneously in the jacket and the pipe with good heat conduction in an apparatus by means of heating the brazing points.

It is essential that there is provided an apparatus which concentrically embraces the jacket plate and thereby urges the radial plates into the grooves in the jacket and on the pipe which are filled with brazing material, whereby at the same time the brazing points are heated by sources of heat disposed externally of the jacket and internally of the pipe.

Such a structure is important to attain uniform heat transfer from the pipe toward the jacket on the outside.

In designs in which the jacket plate does not completely embrace the radiator, which is the case when, for example, the radiator is used under plaster or fitted against the wall, it is important that the U-shaped jacket plate sourrounding the radiator is held together by straps mounted in spaced intervals one below the other, whereby the connection of the straps to the radial plates is effected by means of an apparatus which compresses the straps successively by pneumatic means at equal pressure to produce an equal peripheral tension.

If such radiators are made of aluminum it is to be expected that by heating and cooling a non uniform tension is produced due to lowering of the elasticity of the plates and hence the heat transfer is caused to change. In order to ensure permanently the same degree of heat generation for each radiator it is therefore important that resilient elements, such as straps are utilized. These straps are not of aluminum but are made of an aluminum alloy which has resilient properties, i.e. having a higher elastic limit. In the same way as screws can be equally tightened by application of equal torque, a clamping apparatus ensures that all straps hold the jacket plate together with the same tension, so that a uniform heat transfer is ensured.

An apparatus for carrying out the method includes the feature that heat insulating spacing pieces are arranged between the reflecting plates to maintain a space therebetween.

These insulating members assist the brazing operation by causing it to be carried out at all brazing points simultaneously so that the uniform heat transfer is also ensured during operation.

It is moreover important that the brazing wire is pressed into the grooves during the pipe assembly.

This design also takes into consideration the use of aluminum as material which however with its good heat conductivity, though having a good degree of thermal efficiency, necessitates special requirements for conversion.

The radiators produced by means of the apparatus for carrying out the new method may be of varying design. Thus in one embodiment the U-shaped external jacket embraces the radiator so that the open side abuts against the wall, whereby straps disposed in spaced relationship and connected with the radial plates cause the peripheral tension of the U-shaped jacket.

Such straps simultaneously serve for mounting on the wall when the corresponding cut-outs or bores are formed therein.

A further possible form of construction of the radiator includes an L-shaped externally disposed jacket embracing the radiator. In this construction there are two surfaces disposed at right angles relative to one another and which now leave the other two sides of the radiator open. Such a design is particularly suitable for use under plaster.

For use as in an air conditioning plant it is important that the radiator formed by radial plates should have vertically extending convection channels whereby those fitted against the wall and fed with fresh air have a smaller cross section than the others which have the convection passages causing the air to circulate.

Such a design of the radiator provides many advantages. The rising fresh air, which is given a buoyancy due to the convection effect of the radiator, leaves the radiator at the top at a lower temperature than the hot air conveyed by the circulating air. On account of the greater density of this heated fresh air emerging in a cooler state a shell of heat is formed on the ceiling, and this prevents the circulating fresh air from bounding directly against the ceiling. The circulating air is generally laden with particles of dust from the room and would soon cause the ceiling to become blackened. The induced fresh air however may be kept clear by means of filters, thus creating a warm ceiling cushion without having to expect the ceiling to be blackened.

Further possible designs reside in the fact that there is provided a reflecting surface connected to the pipe carrying the heating water adjoined by the convection channels and fresh air passage.

With such a design the radiator is used as a combined convection and radiating heater. The reflecting surfaces, which is, for example, facing toward the window when the radiator is disposed vertically on either side of the window opening, form a curtain of heat against the entry of cold air through the window. The further heat radiation from the ceiling then causes such radiators to be used with a very satisfactory degree of thermal efficiency.

A further embodiment has the feature that longitudinally extending U-shaped profiles are embedded in pipes of synthetic resin material carrying the heat generating medium, whereby the apices of the profiles are washed over by the medium.

In order to exclude any risk of corrosion it is thus possible to use a synthetic resin material pipe in which metal reflecting surfaces are embedded and which simultaneously form the radial plates.

There is a further possibility for a design of the radiator in which the upper outlet air opening of the convection passages is upwardly increased in cross section. Such a construction takes into consideration the greater volume occupied by the heated air and ensures a uniform resistance distribution in the radiator.

In such a design there is a further possibility for a reflecting plate disposed over the outlet air opening to deflect the flow of hot air towards the coiling and to collect vertically ascending particles of dust.

If the radiator is thus not used with channels carrying fresh air then deflecting surfaces ensure that particles of dust strike thereagainst, which are thus kept away from the coiling, at the same time these deflecting surfaces serve as heat generating reflecting surfaces.

The invention will be described further, by way of example, with reference to the accompanying drawings, in which:

FIG. 10 shows a design of the radiator in front elevation without fresh air spaces;

FIG. 11 is a plan view corresponding to FIG. 10; and

FIG. 12 shows an alternative design of the radiator having an upper reflecting plate.

Figure 1:
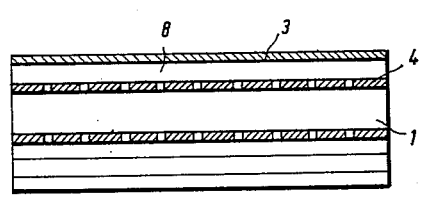
FIG. 1 is a section taken on the line I—I of FIG. 2 of a radiator as produced in accordance with the new method.
Figure 4:
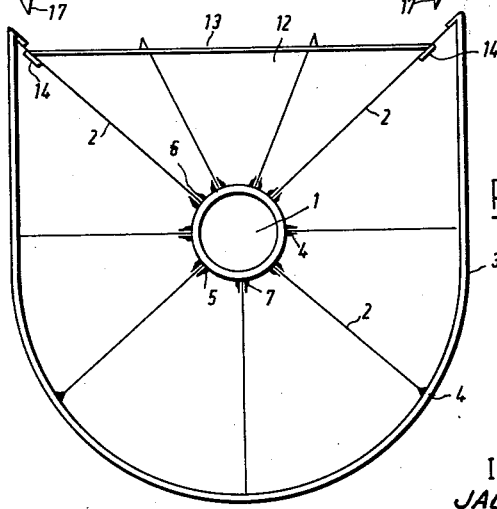
FIG. 4 is an end view of an alternative embodiment of the radiator.

The radiator in FIG. 1 is composed of a tube 1 carrying the heat radiating medium, e.g. the heating water. Radial plates 2 are connected in a heat conducting manner with the pipe 1 and by means of an externally disposed jacket 3 and are pressed against the pipe 1. In this embodiment the ribs 4 are mounted on the pipe, these ribs being more clearly indicated in the other figures. The ribs 4 have grooves 5 (FIG. 4). Brazing wire 7 is pressed into the groove openings 6. On the externally disposed jacket 3 and the pipe 1 there are also provided ribs 4 with grooves 5 thus causing the radial plates 2 now to be clamped on either side between these ribs 4 and in this manner to be secured in a heat conducting manner.

Figure 3:
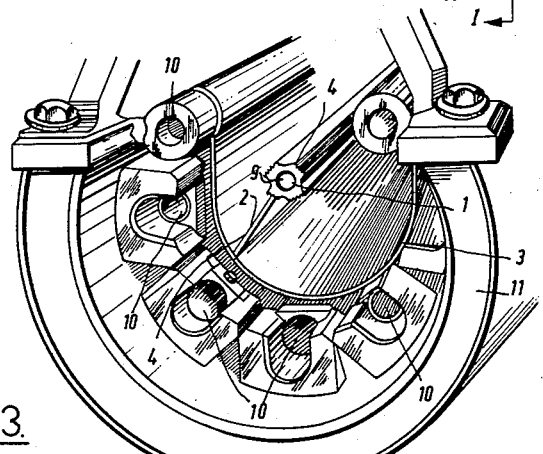
FIG. 3 is a perspective view which shows an apparatus used for producing the radiator shown in FIGS. 1–2.

An apparatus for carrying out this operation is shown in FIG. 3, in which identical reference numerals designate similar parts.

The pipe 1 of FIG. 3 contains a source of heat, 9 which may, for example, be composed of electrical resistance wires or a gas heating device. The other brazing point is heated by means of heat sources 10 of any known construction. A clamping surface 11 is then clamped around the external jacket 3 during the heating of the brazing points which are disposed on either side of the rib 4. The groove opening 6 in relation to the thickness of the radial plates 2 is so dimensioned, that a sliding fit is created, thus ensuring in any case a good heat transfer from the pipe 1 to the externally disposed jacket 3.

Figure 2:
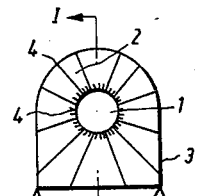
FIG. 2 is an end elevation corresponding to FIG. 1.
Figure 5:
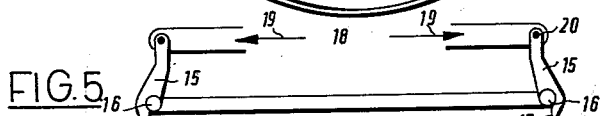
FIG. 5 shows a device adapted to attach the straps or bend them as the case may be in connection with a radiator of FIG. 4.

Identical reference numerals indicate identical parts in FIG. 4. In contrast to FIG. 2 the external jacket 3 of U-shaped design is held together at the open side 12 thereof by means of straps 13, in which the same radial plates 2, which connect the ends of the external jacket 3, simultaneously connect the straps 13 by means of corresponding openings. A flange 14 has to be produced by a separate method. This is effected by the apparatus shown in FIG. 5 in which a pair of two armed levers 15 each swinging about a pivot 16 causes pressure surface 17 to create the flange by bending over the end regions of the straps 13, when compressed air 18 acts in the direction of the arrow 19 against the ends 20 of these two armed levers. It is thus possible to achieve a uniform pressure for all radiators in this flanging end, since these straps are arranged one below the other in spaced intervals. One proceeds so as to provide the whole radiator with a uniform tension which acts between the external jacket 3 on the radial plates 2 and on the pipe 1.

Figure 6:
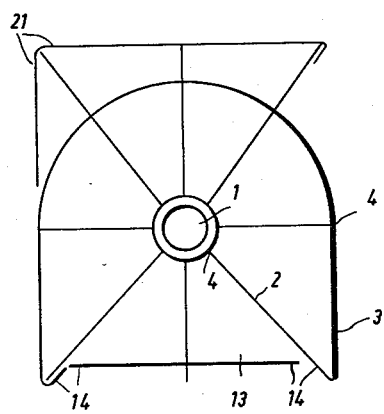
FIG. 6 is an end view of an alternative embodiment of the radiator.

In FIG. 6 the identical reference numerals designate same parts. In this embodiment an L-shaped external jacket 21 is provided which permits the mounting thereof under plaster.

A special design of the radiator is necessary when it is to be used for air conditioning plants.

Figure 7:
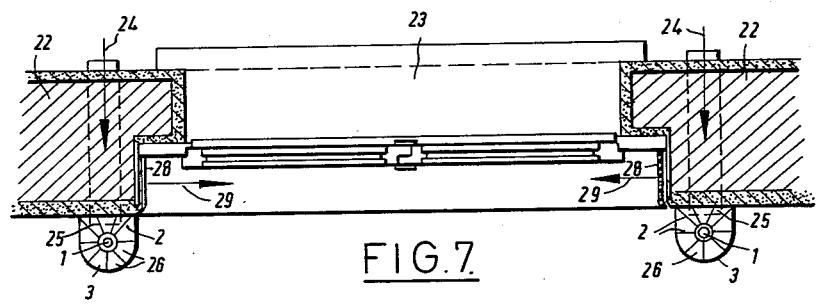
FIG. 7 is a diagrammatic side elevation showing a further design and use of the radiator in an air conditioning plant.

FIG. 7 shows the external walls 22 with a window opening 23. The radiators are arranged so as to lie on either side of the window. Fresh air 24 is supplied from the rear through the wall. This fresh air is conducted upwardly in fresh air ducts 25, while the other convection ducts 26 formed by the radial plates 2 circulate the air. The less heated fresh air 24 is discharging upwards below the ceiling and is heavier than the air thus causing the hot air, to be pressed downwards or to radiate from the ceiling respectively.

It is also possible for reflecting surfaces 28 to be mounted directly on the pipe 1 which conveys the heating water 27, so that the window opening is covered by heat in the direction of the arrow 29 on either side by these reflecting surfaces.

Figure 9:
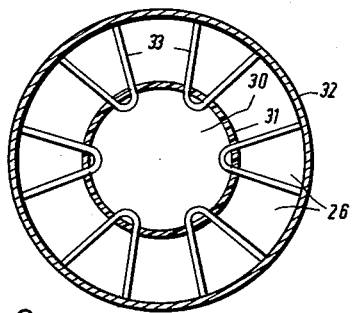
FIG. 9 shows an alternative possibility of design of the radiator when using synthetic resin materials.
Figure 8:
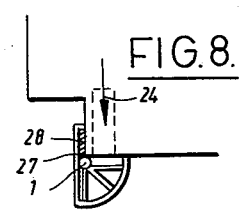
FIG. 8 shows a special design of the radiator when used as shown in FIG. 7.

FIG. 9 shows a radiator 30, which is composed of a synthetic material pipe 31, has a round jacket plate 32 and U-shaped profiles 33 to effect the heat transfer from the heat generating medium which is carried in the synthetic material pipe 31, to the shell plate 32. Thus the shell plate 32 and the U-shaped profiles 33 are of metal and the apices 33 of the profiles are washed over by the heat generating medium thus creating a corrosion proof design causing a good heat transfer and causing convection ducts 26 of varying size to be formed herein.

FIGS. 10 and 11 show a radiator which is secured to the wall by means of iron brackets 34 and which heats only by means of a circulating air heating system, wherein the radiator extends from the floor 35 to the ceiling 36 of the room and the cold air enters through filters 37 and is discharged through upper air discharge opening 38. These air discharge openings are in staggered arrangement to create an air discharge opening which is as large as possible and due to the deflection of the hot air stream particles of dust are prevented from being discharged, which nevertheless reach the radiator through the filter 37.

In FIG. 12 the external jacket 3 has an upper air discharge opening 38 which is formed by a baffle 39. The discharged hot air bounces against a reflecting plate 40 thus deflecting the hot air stream downwardly and this reflecting plate 40 also assists the heat radiation in the downward direction. A lamp 41 serves to improve the appearance of the heating system, which may also be concealed by plaster, so that when there are several radiators this gives the impression of a circular illumination without disclosing the existence of radiators, since the reflecting plates 40, which may be designed as continuous sheet metal beadings, simultaneously serve to reflect the rays of light from the lamps 41, which may of course also be designed as fluorescent tubes.

Radiators produced by the method of the invention and using appropriate devices have various possible fields of application. The radiators may be used in climatic plants or as individual units and may be produced cheaply having a pleasant appearance, great durability, and a good thermal efficiency, and these radiators solve the heating problem in an excellent manner.

What I claim is:

1. A method for producing radiators having a plurality of radial plates arranged between an externally disposed U-shaped jacket having spaced grooves at the inside thereof and an internal pipe having spaced grooves at the outside thereof, comprising the steps of pressing brazing wire into said grooves, inserting said plates between opposite grooves in said jacket and said pipe, applying bonding heat from the outside of the jacket and the inside of the pipe so as to braze said plates both to the jacket and to the pipe, and tensionally inserting by flanged connections strap means intermediate the end portions of said U-shaped jacket, thereby adding stability by mechanical forces to the stability attained by brazing.

2. The method as claimed in claim 1 further comprising the step of surrounding said radial plates by a ring and to firmly interconnect said ring with said plates both by brazing and by mechanical forces.

References Cited in the file of this patent

UNITED STATES PATENTS

| | | |
|---|---|---|
| 1,921,928 | Jones et al. | Aug. 8, 1933 |
| 2,036,417 | Laird | Apr. 7, 1936 |
| 2,150,233 | Martin | Mar. 14, 1939 |
| 2,445,471 | Buckholdt | July 20, 1948 |
| 2,692,763 | Holm | Oct. 26, 1954 |
| 2,693,026 | Simpelaar | Nov. 2, 1954 |
| 2,756,032 | Dowell | July 4, 1956 |
| 2,778,610 | Bruegger | Jan. 22, 1957 |
| 2,961,749 | Brown | Nov. 29, 1960 |